Sept. 4, 1934. W. H. ELLIS, JR Re. 19,301

INDENTED PAPER

Original Filed Dec. 19, 1930

INVENTOR.
WILLIAM H. ELLIS, JR.
BY
ATTORNEYS.

Reissued Sept. 4, 1934

Re. 19,301

UNITED STATES PATENT OFFICE 19,301

INDENTED PAPER

William H. Ellis, Jr., Glendale, Ohio

Original No. 1,863,973, dated June 21, 1932, Serial No. 503,517, December 19, 1930. Application for reissue June 18, 1934, Serial No. 731,159

4 Claims. (Cl. 154—55)

My invention relates to indented paper which is combined in more than one layer to form a composite sheet of excellent insulating and cushioning properties and very low in cost of ingredients and mode of manufacture.

The usual material employed in the arts for partitions between, and protection of fragile articles, and generally wherever it is desired to employ paper board for insulating or cushioning, is formed of one or more layers of corrugated paper pasted to flat sheets known as facing. This type of material is known in the trade as corrugated board, either single or double faced or double-double, as may be.

The operations for making corrugated paper require careful control and cannot be speeded up beyond certain quite definite limits. It requires expensive machinery and is a difficult operation to paste the facing sheet or sheets thereto. Furthermore, the material used (termed the furnish) must contain definite proportions of expensive fiber to meet the physical requirements of taking the corrugations and retain strength or rigidity sufficient for good cushioning qualities.

Indented paper, on the other hand, can be made of a cheap furnish consisting largely of waste papers, the indentations or protuberances being imparted to the sheet in the process of original formation of the fibers, and hence having a firm, set, or rigid fiber structure at origin. The operations of pasting sheets thereof together can be very rapid, and the machinery used is inexpensive and easy of control, as will be shown herewith.

Indented paper, instead of being provided with regular transverse corrugations, is formed with small protuberances and indentations. The patterns used in the art are of various sizes and shapes, but in any one sheet the pattern must be regular.

It is the object of my invention to paste one or more sheets of indented paper together. I have found it to be impractical to attempt to paste two like sheets together, and avoid nesting of the indentations and protuberances. Thus, two sheets of indented paper made on the same pattern will be such that the protuberances on one sheet will seat in the indent tions of the other, unless a very exact relationship can be maintained during pasting. This relationship cannot be maintained at practical operating speeds on a pasting machine.

Accordingly, I employ in my invention sheets of indented paper which do not have the same pattern impressed into them, or if I use sheets which have the same pattern, I turn one sheet at right angles to the other before pasting, which results practically in the same thing as using two sheets of different pattern.

I prefer to employ indentation patterns in alternate sheets which are arranged not to nest with each other, and run long sheets of the several different kinds of paper through a continuous pasting operation. To this end I provide indented webs of which one sheet will have the indentations and protuberances close to each other laterally of the sheet, and the other sheet will have them close together lengthwise of the sheet. With such an arrangement, no projection on the one sheet will fit into an indentation on the other.

I may, however, employ any two indented sheets which will not, as a result of lengthwise or lateral shifting during the pasting operation, nest together, whereby the completed pasted sheet will have a maximum cross section which is substantially equal to the sum of the maximum cross sections of the pieces making them up, whether or not the sheets maintain exactly the same relation to each other during pasting.

I have illustrated and will describe one particular mode of accomplishing my invention, and will append to the ensuing specification thereof, certain claims which set forth the invention inherent therein.

In the drawing:—

Figure 2:
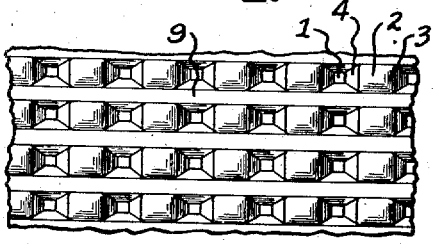
Figure 2 is a plan view of one sheet of indented paper.

The sheet of indented paper shown in Figure 2 is typical of the modern small sized indentation paper. It has, regarding the sheet from the top, a series of indentations having bases 1, and a series of protuberances having crests 2. Such indentations are made with rolls having their surfaces cut to form a series of projecting flat topped or rounded topped pins, the pins of one roll arranged or timed so as to mesh between the pins of the other roll during the indenting operation which is incident to passing a soft sheet of paper between them.

The walls of the protuberances which are preferably somewhat rounded, are indicated at 3, and the walls of the indentations which are also preferably somewhat rounded, are indicated at 4. The important characteristic is the arch-like formation in cross section.

It will be noted of this sheet that the projections and indentations are arranged in rows crosswise of the sheet, resulting in crosswise rows of deformations, with the main body of the sheet, as indicated at 9, interspacing the rows.

Figure 3:
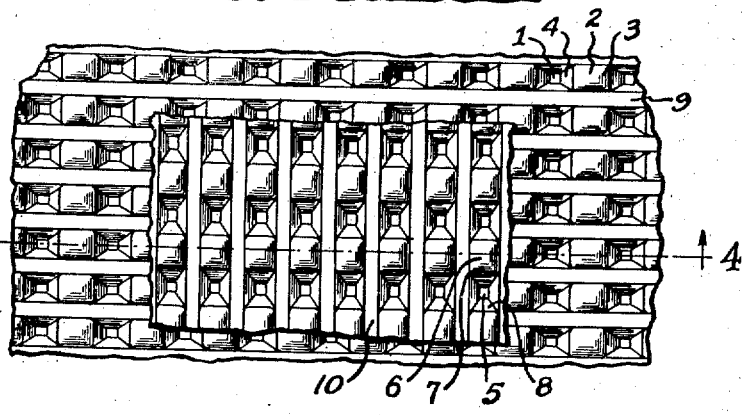
Figure 3 is a plan view showing another piece of indented paper with the sheet shown in Figure 2 underlying the same.

Referring to Figure 3, the topmost sheet is oppositely arranged to the sheet of Figure 2. In this instance the bases of the indentations are indicated at 5, and the crests of the protuberances at 6. The side walls of the protuberances are indicated at 7, and the side walls of the indentations are indicated at 8. In the case of this second sheet, it will be observed that there are rows of deformations lengthwise of the sheet, with the undeformed portion of the paper at 10 between the rows. Also, the maximum dimensions of the deformations in each sheet is in the direction of the rows.

Figure 4:
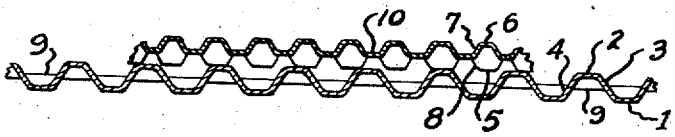
Figure 4 is a section on the line 4—4 of Figure 3.

When two such sheets of paper are placed on top of each other, as indicated, and as shown, in section in Figure 4, the protuberances extending in the lengthwise direction will not fit into the indentations extending in the crosswise direction. In other words, the protuberances of one sheet will remain in substantially offset relation transversely of the plane of the combined sheets from the indentation in the opposing sheet. Thus, I am able to paste two such sheets together without danger of any nesting, and in spite of irregularities in the sheets, due to stretching unequally or displacements in the paster, I will always obtain in the pasted product a sheet which has a maximum thickness equal to the thickness of the two sheets plus the thickness of the paste layer, whatever it may be, due to the non-nesting or offset position of the two sheets.

It will be evident to those skilled in the art that indentations of different patterns from those just described may be used to accomplish the stated object. It will also be noted that the two patterns I have shown can be arranged for by taking two sheets which are exactly alike and turning one at right angles to the other.

It will also be evident that for a three or more ply sheet, the alternate ones will have to be of different indentation pattern.

Figure 1:
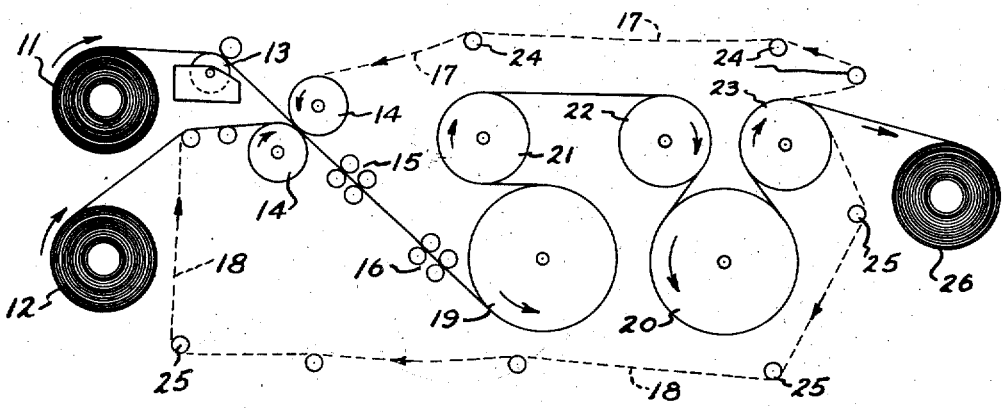
Figure 1 is a diagram of a pasting machine used in pasting two sheets of indented paper together.

In Figure 1 I have indicated a simple pasting machine for uniting the webs. I have there indicated two rolls 11 and 12 which will be of patterns which will not mesh. One of the webs passes over a glue roll 13 and meets the other webs between the soft squeeze rolls 14. Both webs then pass between two groups of pressure guide rolls 15 and 16.

Suitable felts 17 and 18 pass around the squeeze rolls and the remainder of the pasting machine, and carry the two united sheets between them. The felts and the two sheets which have a layer of glue or paste between them, pass around the two heated drying rolls 19 and 20, and the intermediate rolls 21, 22, and 23. After passing over the roll 23, the two felts are guided back over series of idlers 24 and 25, and the pasted sheets may then be rolled up into the rolls 26 or else passed out over a drying table, following which they may be rolled or cut into sections.

This pasting operation is obviously very simple, and the mechanism used quite inexpensive. I illustrate it merely to show one way of uniting the sheets together, since any desired method is consistent with my invention. Thus, the sheets may be united by bands of adhesive instead of a complete coating, and then cut into pads on the glue lines.

Having thus described one particular embodiment of my invention and illustrated a mechanism for carrying out the same, what I claim as novel in the article produced, and desire to cover by Letters Patent, is:—

1. An indented paper board composed of two or more layers of indented paper or paper board combined with adhesive, and each layer having numerous small alternating, pressure resisting indentations and protuberances archlike in any cross section and of such size and/or shape that the protuberances of the one sheet will be substantially in offset relation with the indentations of the adjacent sheet or sheets, whereby the composite thickness throughout the sheet is substantially equal to the sum of the thicknesses of the individual sheets.

2. An indented paper board composed of two or more layers of indented paper or paper board combined with adhesive, and each layer having numerous small alternating, pressure resisting indentations and protuberances archlike in any cross section and of such size and/or shape that the protuberances of the one sheet will be substantially in offset relation with the indentations of the adjacent sheet or sheets, whereby the composite thickness throughout the sheet is substantially equal to the sum of the thicknesses of the individual sheets, the shape of the protuberances and indentations of one sheet being slightly longer than wide, and for the indentations and protuberances of the adjacent sheet against which it is laid, slightly wider than they are long.

3. An indented paper board composed of two or more layers of paper or paper board having indentations therein alternating with protuberances both of such small size that in a pasting operation the relative positions of opposing protuberances and indentations cannot practically be regulated, said layers combined with adhesive, and the indentations of opposing layers so shaped that the protuberances of one sheet have at least one dimension greater than the like dimension of the indentations of the opposing sheet whereby the composite over all thickness of the combined sheets is substantially equal to the sum of the thicknesses of the individual sheets.

4. An indented paper board composed of two or more layers of paper or paper board having indentations therein alternating with protuberances both of such small size that in a combining operation the relative positions of opposing protuberances and indentations cannot practically be regulated, said layers combined by superimposing one on the other, and the indentations of opposing layers so shaped that the protuberances of one sheet have at least one dimension greater than the like dimension of the indentations of the opposing sheet whereby the composite over all thickness of the combined sheets is substantially equal to the sum of the thicknesses of the individual sheets.

WILLIAM H. ELLIS, JR.